United States Patent [19]
Nishida et al.

[11] Patent Number: 4,633,062
[45] Date of Patent: Dec. 30, 1986

[54] ELECTRIC BLANKET

[75] Inventors: Yayoi Nishida, Yamatokoriyama; Katsumi Ishii, Sakurai, both of Japan

[73] Assignee: Matsushita Electric Industrial Co., Ltd., Osaka, Japan

[21] Appl. No.: 789,508

[22] Filed: Oct. 21, 1985

[30] Foreign Application Priority Data

Oct. 30, 1984 [JP] Japan .................................. 59-228107

[51] Int. Cl.4 ............................................ H05B 3/34
[52] U.S. Cl. .................................... 219/212; 219/518; 219/529; 200/85 R
[58] Field of Search ............... 219/211, 212, 217, 518, 219/528, 529, 548, 549; 200/85 R, DIG. 18

[56] References Cited

U.S. PATENT DOCUMENTS

| | | | |
|---|---|---|---|
| 836,282 | 11/1906 | Shellhamer | 219/518 |
| 2,424,438 | 7/1947 | Downie | 219/518 |
| 4,020,482 | 4/1977 | Feldl | 200/85 R |
| 4,264,904 | 4/1981 | McCoy | 200/85 R |

Primary Examiner—E. A. Goldberg
Assistant Examiner—Teresa J. Walberg
Attorney, Agent, or Firm—Stevens, Davis, Miller & Mosher

[57] ABSTRACT

The temperature control of an electric blanket changes the preset temperature in accordance with the presence or absence of a human body so as to ensure comfortable sleeping. The preset temperature is changed to a higher temperature setting upon connecting the power source. When the user goes to bed so that the human body is detected by human body detecting means, the higher temperature setting is automatically decreased by setting changing means to the temperature preset by temperature setting means. Also, when the user rises for the time being after having fallen asleep, the preset temperature is automatically raised so that the user is again allowed to fall asleep comfortably.

3 Claims, 5 Drawing Figures

F I G. I

ELECTRIC BLANKET

BACKGROUND OF THE INVENTION

2. Field of the Invention

The present invention relates to electric blankets.

2. Description of the Prior Art

A typical type of conventional electric blankets includes, as shown in FIG. 5 of the accompanying drawings, a blanket proper 3 having disposed therein an electric heater 1 and temperature detecting means 2 for detecting the temperature of the electric heater 1, temperature setting means 4 for presetting the electric heater 1 to a desired temperature, a preheating switch 8 for starting a preheating operation at a higher temperature setting, a timer 9, setting changing means 6 for restoring the higher temperature setting to the temperature preset by the temperature setting means 4 when the time set by the timer 9 is reached and control means 7 responsive to the temperature detected by the temperature detecting means 2 and a signal from the setting changing means 6 to control the flow of current to the electric heater 1. (For example, Japanese Utility Model Publication No. 48-8176 discloses an electric blanket of the same purport).

With this conventional construction, too much operation is required since it is necessary to turn on the preheating switch 8 and set the timer 9 to the desired time before going to bed and it is not infrequent for the user to forget the setting of the preheating switch 8. Also, the user does not always go to bed at the timer-set time. If the user retires earlier than the timer-set time, the higher temperature setting remains as such and the timer setting must be done all over again thus requiring too much operation. Going to bed without doing the timer setting all over again has the disadvantage of overheating and making the user to feel uncomfortable. Also, if one who has gone to bed rises to go to the toilet, for example, his temperature decreases and he feels cold soon after going to bed again. Then, not only the scale setting must be raised to increase the blanket temperature but also the scale setting must be restored to the initial setting as soon as he gets warm thus requiring too much operation and he frequently falls asleep without restoring the scale setting thus feeling uncomfortable due to the heat while sleeping.

SUMMARY OF THE INVENTION

It is an object of the present invention to provide an improved electric blanket which is convenient to use in that the desired preheating by a higher temperature setting is performed automatically by simply connecting the power source and not positively making the preheating setting, that the change-over from the preheating at the higher temperature setting to the heating by the proper temperature setting established by temperature setting means is made automatically when the user goes to bed during the preheating period and that the heating at the higher temperature setting is automatically made only for a given period of time when the user rises while sleeping for the reason of going to the toilet or the like.

To accomplish the above object, the invention provides an electric blanket employing the following technical means.

In other words, an electric blanket including a blanket having disposed therein an electric heater and temperature detecting means for detecting an electric heater temperature and temperature setting means for presetting the electric heater to a desired temperature, is further provided with human body detecting means for detecting retiring and rising of the user from the bed, setting changing means responsive to the signals from the human body detecting means and the temperature setting means to change the preset temperature and control means responsive to the difference between the signals from the temperature detecting means and the setting changing means to control the flow of current to the electric heater.

The functions of these technical means are as follows.

In other words, with these technical means, when the power source is connected so that the preheating is started at a higher temperature setting irrespective of the preset temperature, in response to the detection of retiring of the user by a signal from the human body detecting means the higher temperature setting is automatically restored to the proper temperature setting preset by the temperature setting means through the setting changing means, and when the user rises while sleeping for the reason of going to the toilet or the like, the absence of the human body is detected by the human body detecting means so that the electric power is automatically increased to temporarily increase the bed temperature so as to warm the cold body and induce sleep and after the expiration of a predetermined time the temperature is automatically restored to the temperature preset by the temperature setting means. In this way, by simply connecting the power source and setting the desired temperature, the required change-over from the preheating to the proper temperature setting is automatically effected, that is, there is no need for the timer setting as in the case of the timer-controlled system and the change-over takes place as soon as the user goes to bed thereby eliminating the need for doing the setting all over again as in the timer-controlled system. Also, if the user rises while sleeping, the absence of the human body is detected so that the electric power is temporarily increased and the bed temperature is raised thereby allowing the user to fall asleep in a comfortable condition.

These factors make the electric blanket very convenient to use.

The present invention has the following effects.

(1) Since the heating is started automatically by a higher temperature setting upon connecting the power source and the higher temperature setting is changed to the desired temperature established preliminarily as soon as the user goes to bed thus allowing the user to go to sleep comfortably, there is no need for setting any preheating as previously and easy handling is ensured.

(2) Since the change-over from the higher temperature setting to the proper temperature setting is automatically effected through the human body detecting means when the user goes to bed, there is no need for doing the setting all over again as in the conventional timer-controlled system and thus much operation is not required.

(3) When the user rises while sleeping so that the rising is detected by the human body detecting means, the higher temperature setting than the preset temperature is temporarily established by the setting changing means and the user going to bed again does not feel cold but is allowed to go to sleep in a comfortable condition. Thus, contrary to the conventional electric blanket, no operation is required to raise or lower the preset temperature and there is no danger of the user feeling uncomfortable due to the heat while sleeping even though the user goes to sleep with the raised preset temperature.

DESCRIPTION OF THE PREFERRED EMBODIMENT

A preferred embodiment of the invention will now be described with reference to FIGS. 1 to 4.

Figure 1:
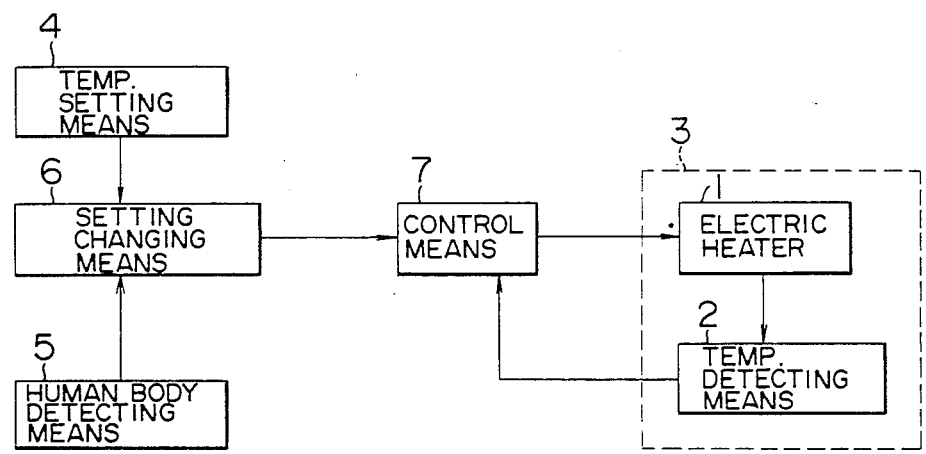
FIG. 1 is a block diagram of an electric blanket according to an embodiment of the invention.
Figure 2:
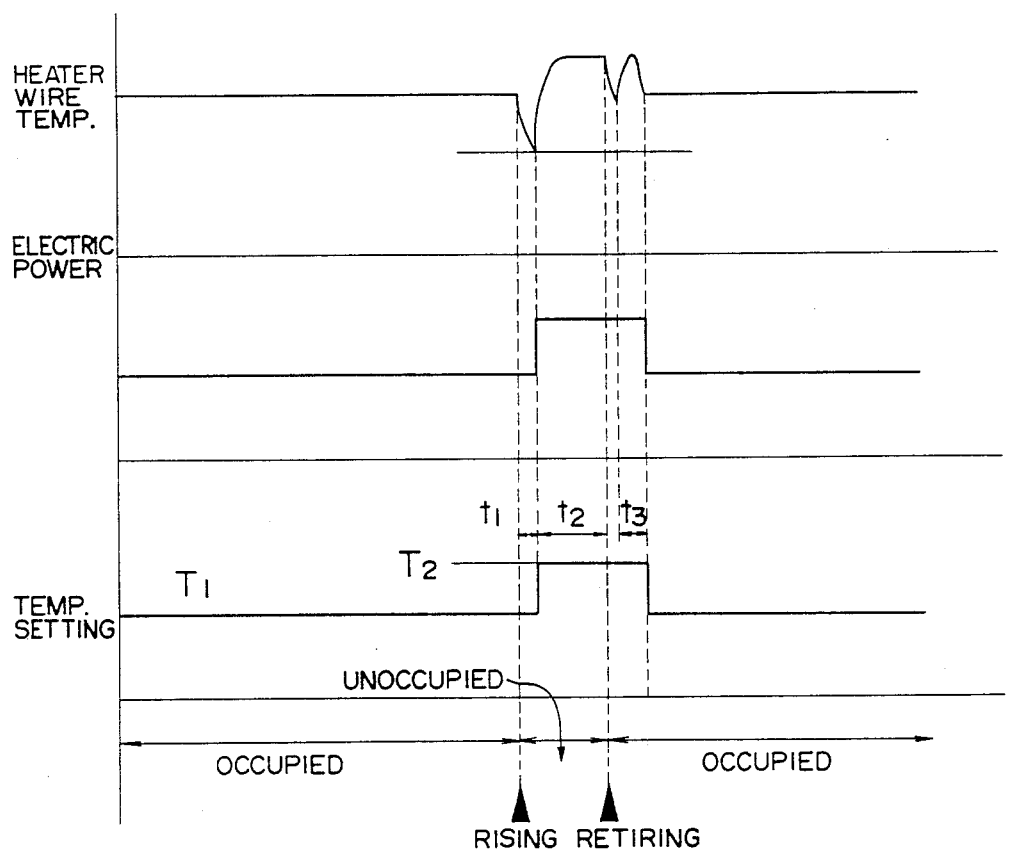
FIG. 2 is a diagram showing the operation of the electric blanket when the user rises while sleeping.

Referring to FIG. 1, there is illustrated an electric blanket including a blanket proper 3 having disposed therein an electric heater 1 and temperature detecting means 2, temperature setting means 4 whereby the user sets the electric heater 1 to the desired temperature by means of a knob or the like, human body detecting means 5 for detecting retiring or rising of the user in response to the presence or absence of the human body, setting changing means 6 responsive to the signal from the human body detecting means 5 to change the preset temperature and control means 7 responsive to the signals from the setting changing means 6 and the temperature detecting means 2 to control the flow of current to the electric heater 1. When the power source is first connected, the preheating is started at a higher temperature setting (e.g., the maximum temperature) irrespective of the temperature preset by the user through the temperature setting means 4. Then, when the user goes to bed so that the human body detecting means 5 detects the retiring of the user to bed, in response to the signal from the human body detecting means 5 the setting changing means 6 automatically lowers the temperature setting to the proper temperature setting established by the temperature setting means 4 and thus the user is allowed to comfortably fall asleep without any labor. Also, when the user rises while asleep for the purpose of going to toilet or the like as shown in FIG. 2, the heater wire temperature is decreased. This temperature change is detected by the human body detecting means 5 so that at the expiration of a time $t_1$ after the retiring the human body detecting means 5 generates a signal and the setting changing means 6 generates a signal thereby increasing a preset temperature $T_1$ to $T_2$ by a predetermined amount (e.g., 2° C.). When the user goes to bed again after a time $t_2$, the heater wire temperature is again decreased and this temperature change is detected by the human body detecting means 5 to generate a signal. Thus, the timer section in the setting changing means 6 is started and the temperature is decreased to the initial preset temperature $T_1$ after a time $t_3$ (e.g., after 15 to 20 minutes). Thus, when the user gets into bed again, the bed is fairly warm at first even if his body is cold and the user is allowed to fall asleep without any need to change the scale setting and without any additional operation as previously.

Figure 3:
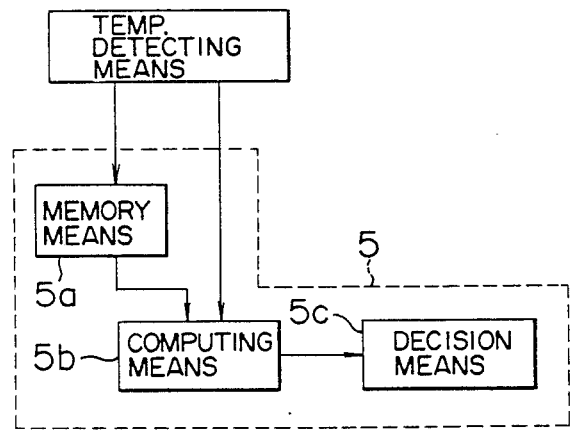
FIG. 3 is a block diagram showing the human body detecting means in the embodiment of FIG. 1.

As shown in FIG. 3, the human body detecting means 5 includes for example memory means 5a for storing the signal from the temperature detecting means 2 for detecting the temperature of the electric blanket, computing means 5b for computing the difference between the stored temperature and the current temperature or the temperature changed in response to the presence or absence of the human body and decision means 5c responsive to the signal from the computing means 5b to determine the retiring or rising of the user on the basis of the presence or absence of the human body. In the case of a mattress blanket, the human body detecting means may be a pressure sensor for sensing the presence or absence of a human body in terms of a weight.

Figure 4:
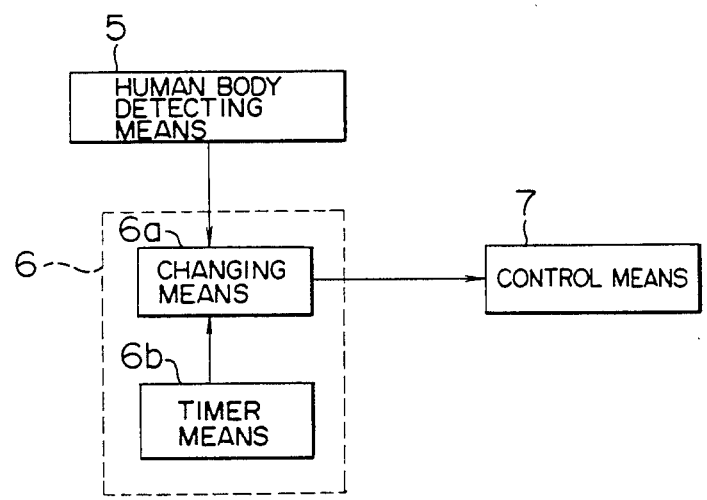
FIG. 4 is a block diagram showing the setting changing means in the embodiment of FIG. 1.
Figure 5:
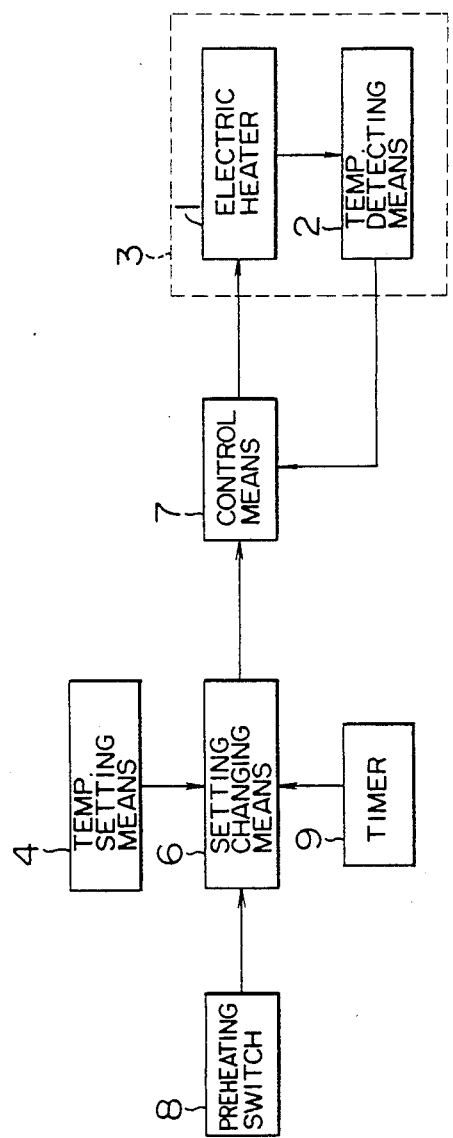
FIG. 5 is a block diagram showing a conventional electric blanket.

As shown in FIG. 4, the setting changing means 6 includes changing means 6a for establishing a higher temperature setting than the temperature preset by the temperature setting means 4 and timer means 6b for maintaining the changed value for a predetermined time. Thus, as shown in FIG. 2, when the user rises so that the changing means 6a raises the preset temperature, the raised temperature is maintained for a predetermined time by a signal from the timer means 6b and the bed is warmed thereby allowing the user to fall asleep in a comfortable condition.

We claim:

1. An electric blanket comprising:
   a blanket proper having disposed therein an electric heater and temperature detecting means for detecting an temperature of said electric heater;
   temperature setting means for establishing a desired temperature setting of said electric heater;
   human body detecting means for detecting the presence or absence of a human body;
   setting changing means responsive to signals from said temperature setting means and said human body detecting means to change said temperature setting; and
   control means responsive to a difference between signals from said temperature detecting means and said setting changing means to control the flow of current to said electric heater.

2. An electric heater according to claim 1, wherein said human body detecting means comprises memory means for storing a signal from said temperature detecting means, computing means for computing a difference between a current temperature and the temperature stored by said memory means, and decision means responsive to a signal from said computing means to determine the presence or absence of a human body.

3. An electric blanket according to claim 1, wherein said setting changing means includes changing means responsive to a signal from said human body detecting means for changing the value preset by said temperature setting means to a higher value, and timer means for maintaining said changed value for a predetermined period of time.

* * * * *